No. 827,098. PATENTED JULY 31, 1906.
C. HOCKIN.
HORSE RAKE.
APPLICATION FILED AUG. 10, 1905.
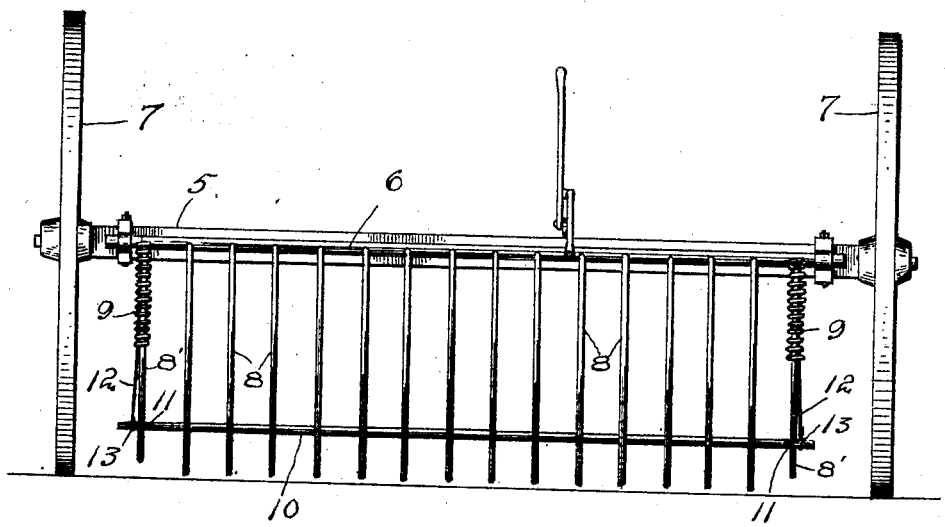
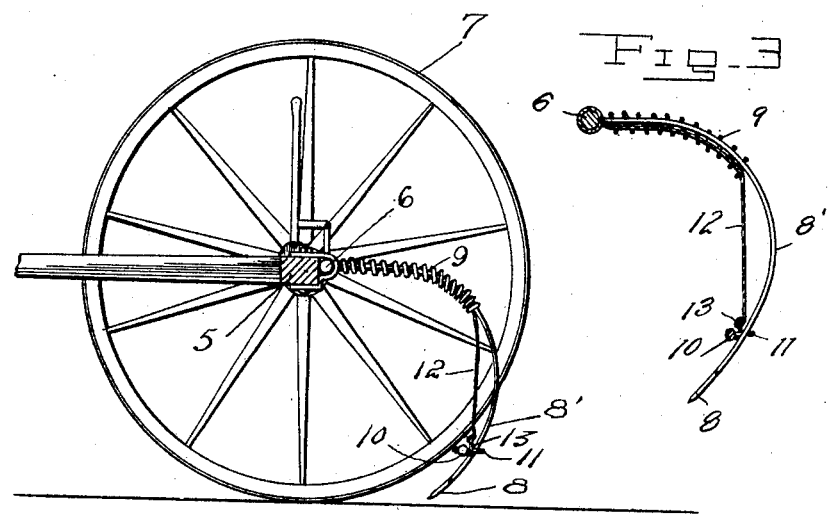

UNITED STATES PATENT OFFICE.

CHARLES HOCKIN, OF MINOT, NORTH DAKOTA.

HORSE-RAKE.

No. 827,098.   Specification of Letters Patent.   Patented July 31, 1906.

Application filed August 10, 1905. Serial No. 273,582.

*To all whom it may concern:*

Be it known that I, CHARLES HOCKIN, a citizen of the United States, residing at Minot, in the county of Ward, State of North Dakota, have invented certain new and useful Improvements in Horse-Rakes; and I do hereby declare the following to be a full, clear, and exact description of the invention, such as will enable others skilled in the art to which it appertains to make and use the same.

This invention relates to hay-rakes, and more particularly to attachments therefor, and has for its object to provide an attachment which will operate to prevent blowing of the hay from the rake.

Another object is to provide an extremely simple and cheap device of this nature.

Other objects and advantages will be apparent from the following description, and it will be understood that changes in the specific construction shown and described may be made within the scope of the claims and that any suitable materials may be used without departing from the spirit of the invention.

In the drawings forming a portion of this specification, and in which like numerals of reference indicate similar parts in the several views, Figure 1 is a front elevation of a rake provided with the present invention. Fig. 2 is an end view of the rake proper, one of the ground-wheels being removed. Fig. 3 is an enlarged detail view showing the connection of the depressor-rod with the rock-shaft.

Referring now to the drawings, the present rake comprises the usual frame 5, having a rock-shaft 6 mounted therein and provided with ground-wheels 7. Rearwardly and downwardly extending rake-teeth 8 are carried by the rock-shaft, and this shaft is movable to move the teeth vertically. The outermost teeth (indicated at 8') are somewhat shorter than the remainder of the teeth, and these teeth have helical springs 9 engaged with the upper portions thereof and secured against movement bodily upon the teeth.

A horizontal depressor-rod 10 extends transversely of the teeth and has loops 11 adjacent to its ends, in which the teeth 8' are received for sliding movement of the depressor-rod longitudinally of the teeth. The depressor-rod has considerable weight, so that it is held normally at the downward limit of its movement, this limit being fixed by suitable flexible connections 12, secured at their upper end to the rock-shaft and having snap-hooks 13 at their lower ends, which are engaged with the loops 11, the depressor-rod being thus held against disengagement from the teeth, and when in its normal condition this rod lies in spaced relation to the free ends of the teeth and to the lower ends of the springs 9.

In operation as the rake is moved over the ground hay or other matter gathered thereby will accumulate below the depressor-bar, the latter rising as the accumulation increases, it being readily seen that this bar acts to hold the matter against the ground, thus preventing it from being blown away, and when the rock-shaft is operated to raise the teeth the depressor-rod will remain upon the raked matter, the teeth rising independently of the depressor-rod to free themselves from the matter. When the depressor-rod rises to the springs 9, these springs prevent the rod from moving to the forwardly-turned portions of the teeth, except against the action of the springs, and when the teeth are raised the springs hold the rod against the raked matter and prevent the rod from moving with the teeth, as will be understood.

What is claimed is—

1. The combination with a rake including a rock-shaft and teeth secured to the rock-shaft and arranged for vertical movement when the shaft is rocked, of a depressor slidably connected with certain of said teeth for movement longitudinally of the teeth, flexible connections between the depressor and the rock-shaft and springs connected with the rock-shaft and arranged for engagement by the depressor to limit the upward movement of the latter, said depressor lying normally at the downward limit of its movement and adjacent to the free ends of the teeth.

2. The combination with a rake including a rock-shaft and teeth secured to the shaft and arranged for vertical movement when the shaft is rocked, of a depressor-rod, loops carried by the depressor-rod and engaged with the outermost teeth, said depressor-rod extending transversely of the teeth and being arranged for movement longitudinally thereof, flexible connections between the depressor-rod and the rock-shaft to limit the downward movement of the depressor-rod said rod lying normally at the downward limit of its movement, springs engaged with the outermost teeth and lying with their lower ends normally in spaced relation to
5 the depressor-rod, said springs being arranged to receive the rod thereagainst to limit the upward movement of the latter.

In testimony whereof I affix my signature in presence of two witnesses.

CHARLES HOCKIN.

Witnesses:
C. AURLAND,
C. B. BACH.